L. C. MARTIN.
EYEGLASS CONSTRUCTION.
APPLICATION FILED DEC. 26, 1914.

1,131,610.

Patented Mar. 9, 1915.

Witnesses:
Fred Roeger.
H. J. Brunjes.

Inventor
Laurence C. Martin
By Blair & Nathan
Attorneys

UNITED STATES PATENT OFFICE.

LAURENCE C. MARTIN, OF PROVIDENCE, RHODE ISLAND.

EYEGLASS CONSTRUCTION.

1,131,610.  Specification of Letters Patent.  Patented Mar. 9, 1915.

Application filed December 26, 1914. Serial No. 879,024.

*To all whom it may concern:*

Be it known that I, LAURENCE C. MARTIN, a citizen of the United States, and residing at Providence, in the county of Providence and State of Rhode Island, have invented a new and Improved Eyeglass Construction, of which the following specification is a full disclosure.

This invention relates to eyeglass construction.

One of the objects thereof is to provide practical means in connection with a construction of the above type, by which a lens is most securely mounted in position.

Another object is to provide a compact and reliable construction of the above type, of attractive appearance.

Another object is to provide in eyeglass construction means whereby a correct position of the lens clamp with respect to the optical center of the lens is insured.

Another object is to provide means whereby it is practicable to use an eyeglass lens of an increased size.

Other objects will be in part obvious from the annexed drawings and in part indicated in connection therewith by the following analysis of this invention.

This invention accordingly consists in the features of construction, combinations of parts, and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views of which:—

Figure 1:
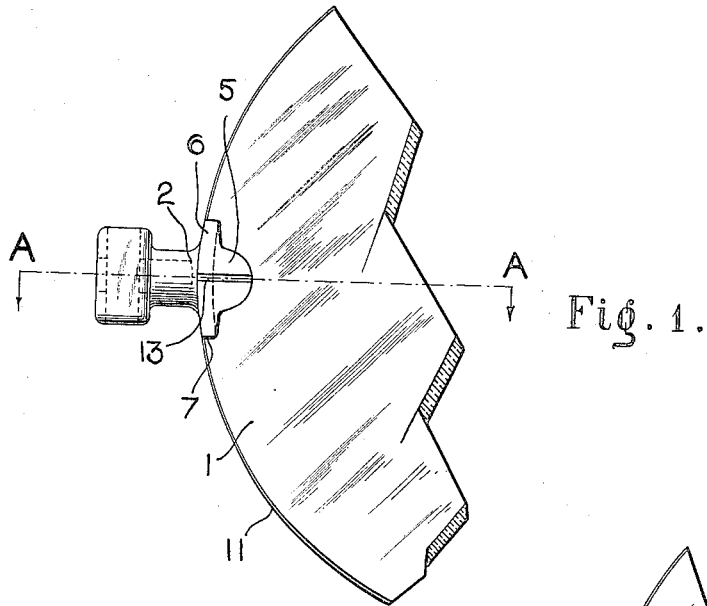
Figure 2:
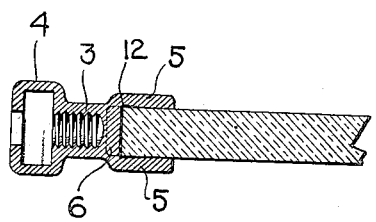
Figure 3:
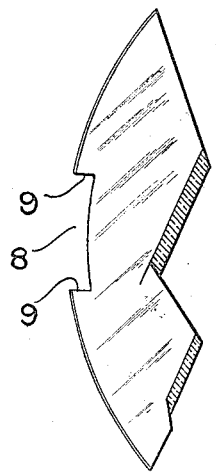
Figure 4:
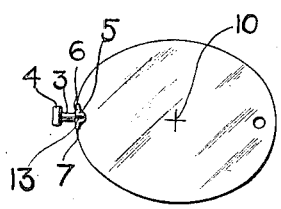

Figure 1 is a rear view of a portion of an eyeglass lens with clamp mounted thereon. Fig. 2 is a sectional plan, taken along the line A—A of Fig. 1. Fig. 3 is a rear view of a portion of the lens removed from the clamp. Fig. 4 is a rear view of an entire lens with clamp secured thereto.

Referring now to Fig. 1 of the drawings, there is shown an eyeglass lens 1, it being understood that the term "eyeglass" is used in a broad sense to comprehend spectacles and the like. Secured to this lens is a lens clamp 2, this term also being broadly used to denote any supporting device adapted to be secured to a lens. Lens clamp 2, as shown in section in Fig. 2 of the drawings, comprises the ordinary post portion 3 and box portion 4, the former being preferably tapped to receive a screw which holds a portion of the mounting within the box 4. Other forms of connecting devices may, if desired, be employed, as this is immaterial to the present invention. The body portion of the clamp comprises side lugs 5 adapted to embrace the lens, and a base portion or "strap" 6 connecting these lugs and preferably extending beyond the same in a direction circumferential of the lens. It is to be understood that the term "strap" is used in its usual broad sense as denoting a circumferentially extending portion connecting the side lugs. Strap 6 terminates in square abutments 7 of a width as great as the thickness of the lugs. Lens 1 is provided at its end with a notch 8 of a considerable length and ending in the square shoulders 9, as best shown in Fig. 3 of the drawings.

The lens clamp 2 is secured to the lens by inserting the latter between the side lugs 5 in such position that the ends 7 of the strap fit tightly between the shoulders 9. In this manner, without further securing means, the lens is interlocked against movement in any direction relative to the clamp, excepting a straight outward pull. The lens clamp is retained in this position preferably by means of cement which is spread between all meeting surfaces of the clamp and lens. This "cement," which may take the form of any suitable adhesive, is subjected to relatively small stresses in the use of the device on account of the interlocking construction above referred to. Due to this, and to the fact that the end surfaces of the strap are utilized, both in a direct mechanical way as well as adhesively, instead of being unused as in ordinary eyeglasses, it is practicable to use a much smaller clamp with a far greater strength of connection. Another advantageous effect gained from setting the clamp into the edge of the lens is that with a given distance between the clamp and the optical center of the lens, the latter being indicated at 10 in Fig. 4 of the drawings, which distance is in general limited by the pupilary distance of the glasses, a lens of materially larger size may be employed, thus giving a corresponding increase to the field of corrected vision. It will readily be seen that the glasses may extend to a greater distance outwardly from the optical center than inwardly to the base of the notch 8 and yet have the optical center substantially at the midpoint of the ellipse formed by the lens.

The lens is given throughout substantially its entire circumference a minute beveling or rounding of the corners of its edges, as indicated at 11, this being common in lenses, but the corners at the base of the notch 8 are sharp as indicated at 12 and fit closely the correspondingly sharp internal corners of the clamp, thus giving an added security of attachment.

Although the lens clamp, which rests smoothly against the base of notch 8 and fits tightly between the shoulders 9, is thus positioned in substantially the proper relation and angle with respect to the optical center, nevertheless for the purposes of a finer adjustment, if desired, an index mark or groove 13 is formed in the side lug 5 on the base side of the glasses, and aids in giving the clamp precisely its proper position with respect to the optical center.

In the use of this device, the lens is provided with a properly shaped notch 8 and the clamp formed to fit this notch, as above described. Cement is then properly applied and if it be of a heat-softened nature, the parts are warmed and the clamp quickly inserted in proper position, as shown in the drawings. The parts are then permitted to cool and the attachment is complete. If it be desired to remove the clamp, as for the purpose of the substitution of another lens, the parts are warmed and the clamp drawn outward in a direction away from the optical center of the lens. It will thus be seen that there is provided a device in which the several objects of this invention are achieved and which presents many advantages in use.

As many changes might be made in the above construction, and as many apparently different embodiments might be made of this invention without departing from the scope thereof, it is intended that all features herein described or shown in the accompanying drawings shall be interpreted as illustrative and not in a limiting sense.

Having thus revealed this invention, I claim as new and desire to secure the following combinations of elements, or equivalents thereof, by Letters Patent of the United States:—

1. In eyeglass construction in combination; a lens having in its edge a circumferentially extending notch and a lens clamp provided with a pair of spaced side lugs embracing said lens and cemented thereto and with a strap portion fitting said notch and having all engaging surfaces cemented to the walls of said notch.

2. In eyeglass construction, in combination, a lens having a circumferentially extending notch provided with substantially radial end walls and a lens clamp provided with a pair of side lugs embracing said lens and with a strap portion extending circumferentially beyond said side portions and closely fitting said notch and having its outer surface substantially flush with the edge of the lens, all contacting surfaces of said clamp and said lens being adhesively secured one to the other.

In witness whereof, I hereunto subscribe my name, as attested by the two subscribing witnesses.

LAURENCE C. MARTIN.

Witnesses:
 ALBERT F. NATHAN,
 B. COOKE.